(12) United States Patent
Muhr et al.

(10) Patent No.: US 7,192,015 B2
(45) Date of Patent: Mar. 20, 2007

(54) PLATE SPRING WITH IMPROVED SETTLEMENT BEHAVIOR

(75) Inventors: Thomas Muhr, Attendorn (DE); Bernfried Hesselmann, Wenden (DE); Andreas Rinsdorf, Freudenberg (DE); Volker Schütz, Daaden (DE); Harold Brenner, Sassenroth (DE)

(73) Assignee: Muhr und Bender KG (DE)

( * ) Notice: Subject to any disclaimer, the term of this patent is extended or adjusted under 35 U.S.C. 154(b) by 0 days.

(21) Appl. No.: 10/901,111

(22) Filed: Jul. 29, 2004

(65) Prior Publication Data

US 2005/0029721 A1   Feb. 10, 2005

(30) Foreign Application Priority Data

Jul. 29, 2003   (DE) ................ 103 34 470

(51) Int. Cl.
*F16F 1/20*   (2006.01)
*B21F 35/00*  (2006.01)

(52) U.S. Cl. .................. 267/164; 29/896.9
(58) Field of Classification Search ............. 267/164, 267/161, 158, 159; 29/896.9, 896.91, 896.93; 72/53; 148/580; 192/89.22, 89.23, 89.24, 192/89.25

See application file for complete search history.

(56) References Cited

U.S. PATENT DOCUMENTS

| | | | | |
|---|---|---|---|---|
| 3,977,504 A | * | 8/1976 | Kajitani ................. | 192/89.25 |
| 4,027,865 A | * | 6/1977 | Greenwood et al. ........ | 267/148 |
| 4,135,283 A | * | 1/1979 | Kohlhage .................. | 148/580 |
| 4,375,253 A | * | 3/1983 | Mott ........................ | 192/89.23 |
| 4,968,010 A | * | 11/1990 | Odobasic ................. | 267/162 |
| 5,492,576 A | * | 2/1996 | Jehl et al. ................ | 148/580 |
| 5,868,022 A | * | 2/1999 | Mizukami ................ | 72/53 |
| 6,918,479 B2 | * | 7/2005 | Pahrisch et al. ......... | 192/89.25 |

FOREIGN PATENT DOCUMENTS

| | | |
|---|---|---|
| DE | 2 229 028 | 1/1973 |
| DE | 25 43 693 A1 | 4/1976 |
| DE | 44 44 649 A1 | 6/1995 |
| DE | 198 05 797 A1 | 8/1998 |
| WO | WO 00/77367 A2 | 12/2000 |

OTHER PUBLICATIONS

Patent Abstract of Japan, Publication No. 2000027915, Publication Date Jan. 25, 2000, Hayata Hideki.

* cited by examiner

*Primary Examiner*—Pam Rodriguez
(74) *Attorney, Agent, or Firm*—Sughrue Mion, PLLC

(57) ABSTRACT

A plate spring of a substantially circular-ring-shaped form having a substantially externally conical upper side (12) and a substantially internally conical underside (13) between which there are positioned an outer annular edge (14) and an inner annular edge (15), wherein, in the unloaded condition, the surface layer (17) of the underside (13) comprises a higher inherent compressive stress than the surface layer (16) of the upper side (12).

5 Claims, 2 Drawing Sheets

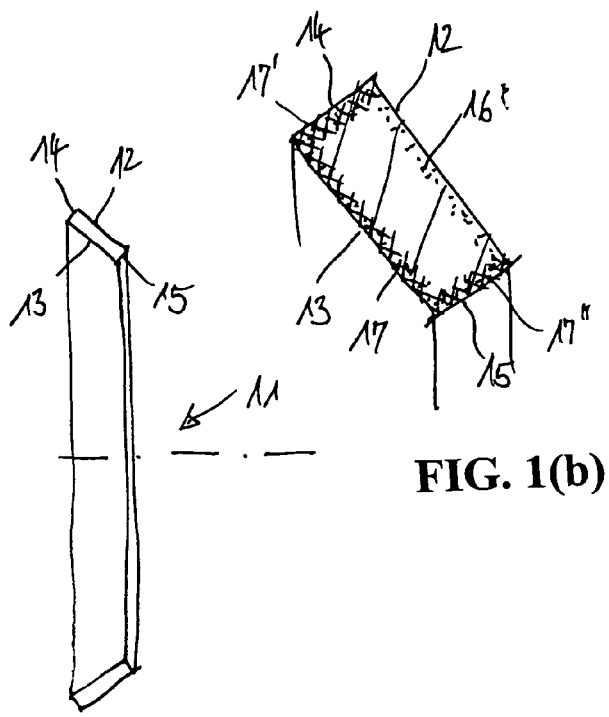
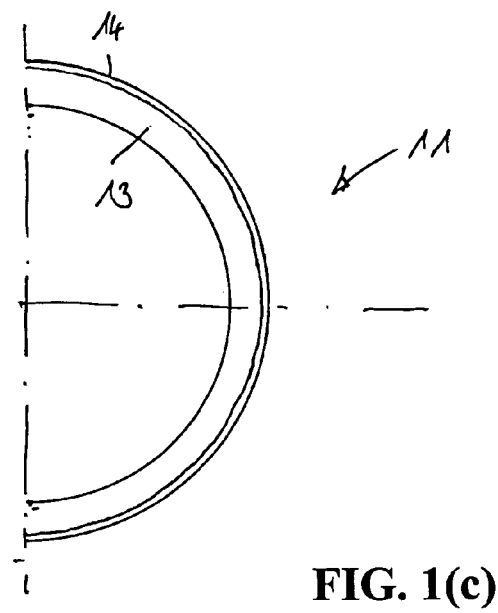
FIG. 1(a)
FIG. 1(b)
FIG. 1(c)
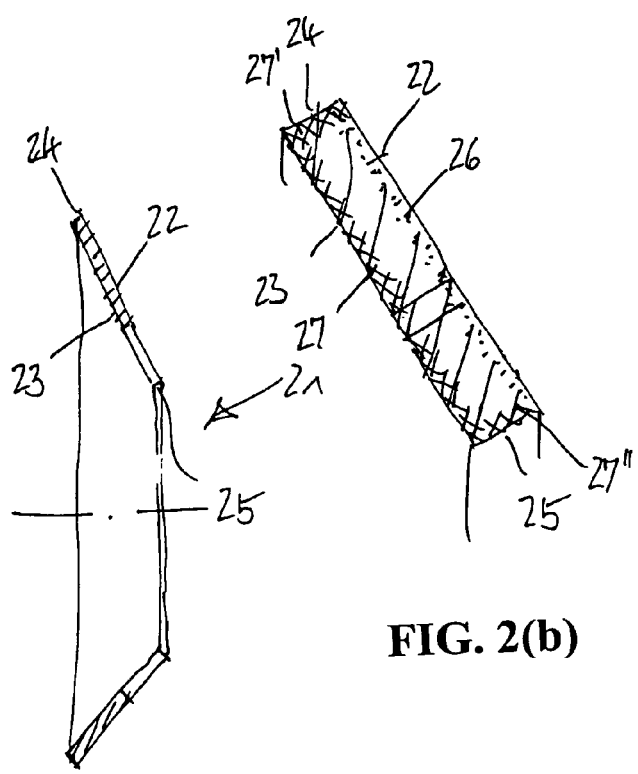
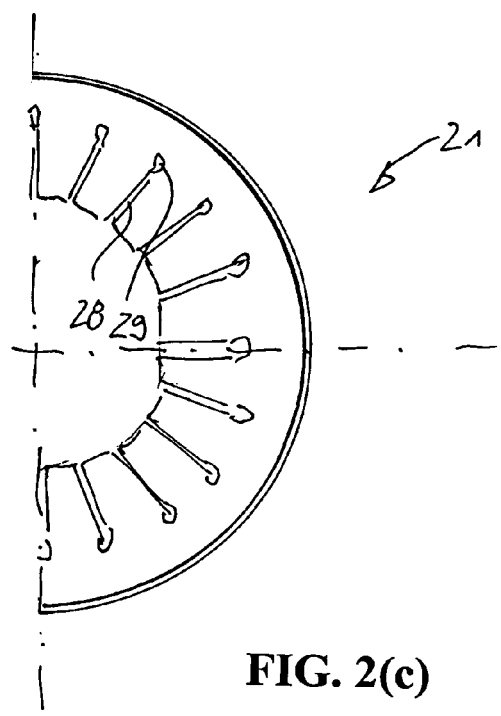
FIG. 2(a)
FIG. 2(b)
FIG. 2(c)

PLATE SPRING WITH IMPROVED SETTLEMENT BEHAVIOR

BACKGROUND OF THE INVENTION

The invention relates to a plate spring of a substantially circular-ring-shaped form having a substantially externally conical upper side and a substantially internally conical underside between which there are positioned an outer annular edge and an inner annular edge, and to a method of producing plate springs. Plate springs, while having an extremely short length, usually have very steep spring rates, i.e. they combine high returning forces with a short spring travel. They are frequently used in the form of spring packages with identical or changing cone positions, but also in the form of individual spring elements, e.g. as compressive coupling springs in motor vehicles or in the form of piston returning springs in automatic gearboxes.

The concept of introducing inherent compressive stresses and compressive pre-stresses to increase the fatigue strength of plate springs is generally known. In industrial practice, this is normally achieved by shot-blasting the plate springs. For this purpose, there is available a number of different shot-blasting methods such as centrifugal blasting (drum blasting) or injector blasting (shot-blasting by air jets). The former method is particularly suitable for treating bulk material, i.e. plate springs with smaller diameters of just a few mm, whereas the latter method is suitable for larger individual parts, for example plate springs with a diameter of several 100 mm. The objective of such treatments is to achieve as uniform a compaction as possible of all surfaces. This results in uniform internal compressive pre-stresses in all surface layers of the component, with "surface layer" referring to the component surface layer subjected to the compaction process.

As is generally known, plate springs of the above-mentioned type experience a settlement behavior, i.e. a relaxation-related decrease in force as a function of time or as a function of the number of load cycles. To be able to maintain the required characteristic curves for the entire service life, the plate springs first have to be built in with an excess of pre-stress, which, initially, leads to an excessively hard operation of the functional parts in question or, it is necessary to provide a readjustment facility for their stops, which increases the costs of the design in question.

SUMMARY OF THE INVENTION

It is therefore the object of the present invention to provide plate springs which have an improved relaxation behavior and a method of producing such plate springs.

The objective is achieved by providing a plate spring of said type wherein, in the unloaded condition, the surface layer of the underside comprises a higher inherent compressive stress than the surface layer of the upper side.

In this way it is possible to prevent the upper side of the plate spring, when pressure-loaded, from being subject to a particularly pronounced settlement behavior due to an impressed inherent compressive pre-stress such as it occurs in prior art plate springs. The inventive plate springs in which the surface layer of the upper side in the unloaded condition, at most, due to a standard heat treatment, has a slight inherent compressive pre-stress or, preferably, is free from an inherent compressive stress or, as a result of standard plane pressing after heat treatment, has an inherent tensile pre-stress, thus experiences a much better settlement behavior which, after a short time and/or after slight losses in the force/travel diagram, is completed or is lost to such an extent that it no longer has any further adverse effects. However, on the tension-loaded underside of the plate spring, the existence of an inherent compressive pre-stress in the surface layer is in fact positive in the sense of a slight settlement behavior.

Production processes which aim at reducing the loss of settlement of the plate spring in operation can thus be reduced in scope or even eliminated altogether. Due to the low settlement loss of the plate spring in operation, a further advantage is the possibility of designing the plate spring from the outset that has a lower force level. It thus becomes possible to use a plate spring with smaller dimensions in a smaller space under specified conditions.

In a preferred embodiment, in the unloaded condition, also the surface layers of the outer annular edge and of the inner annular edge will have a higher inherent compressive pre-stress than the surface layer of the upper side; more particularly, the latter surface layers will have the same increased inherent compressive pre-stress as the surface layer of the underside.

The plate springs in accordance with the invention can be provided with continuous circular outer and inner annular edges or comprise an outer circular-ring-shaped annular edge or comprise radial slots starting from the inner annular edge or have an inner circular-ring-shaped annular edge as well as radial slots starting from the outer annular edge.

A first inventive method of producing said plate springs is characterized in that, after the forming and heat treatment operations, the surface layer of the underside is subjected to a mechanical compaction process from which the surface layer of the upper side is excluded. More particularly, the surface layer of the outer and inner annular edges can be subjected to the same mechanical compaction process as the surface layer of the underside. More particularly, the methods mentioned here are the initially mentioned shot-blasting methods which, in this case, only need to be used on a fixed plate spring with a specific blasting direction.

A second inventive method is characterized in that, after the forming and heat treatment operations, the surface layer of the underside is subjected to a further heat treatment stage for generating an inherent compressive pre-stress from which the surface layer of the upper side is excluded. In this case, too, the outer and inner annular edges are preferably included in the treatment process for the underside. Suitable additional treatment stages are those which lead to a growth of material in the respective surface layer and from which individual surface parts, i.e. the upper side in this case, can be excluded. These treatment stages can be certain laser heat treatment processes or nitriding processes.

Preferred embodiments of the invention are illustrated in the drawings and will be described below.

BRIEF DESCRIPTION OF THE DRAWINGS

FIG. 1(a) is a longitudinal sectional view of a plate spring according to a first embodiment, FIG. 1(b) is an exploded view of a portion of FIG. 1(a), and FIG. 1(c) is a plan view of the plate spring of the first embodiment;

FIG. 2(a) is a is a longitudinal sectional view of a plate spring according to a second embodiment, FIG. 2(b) is an exploded view of a portion of FIG. 2(a), and FIG. 2(c) is a plan view of the plate spring of the second embodiment.

DETAILED DESCRIPTION OF THE INVENTION

Figures 3A, 3B, 3C:
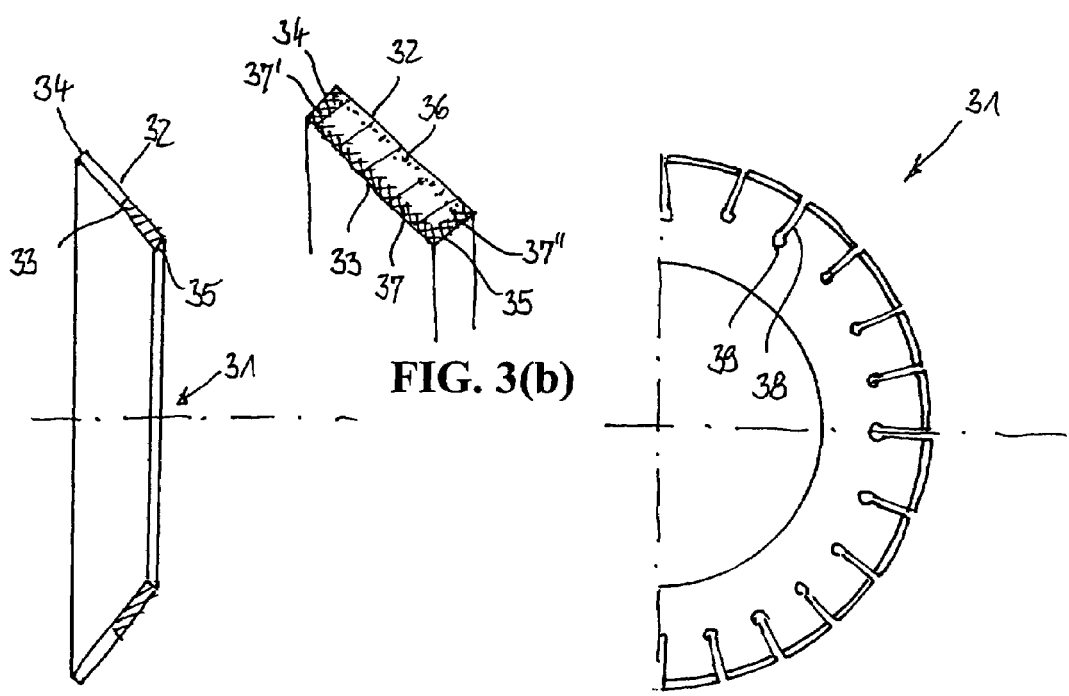
FIG. 3(a) is a is a longitudinal sectional view of a plate spring according to a third embodiment.
FIG. 3(b) is an exploded view of a portion of FIG. 3(a)
FIG. 3(c) is a plan view of the plate spring of the third embodiment.

FIGS. 1(a)–1(c) illustrate a circular-ring-shaped plate spring of a substantially uniform material thickness and a conical basic shape, according to a second embodiment of the invention. The plate spring 11 comprises an externally conical upper side 12 and an internally conical underside 13, an outer annular edge 14 and an inner annular edge 15. Plate springs of this type are frequently used in the form of plate spring packages with coinciding cone positions or changing cone positions for generating high axial spring forces. As can be seen only in FIG. 1(b), the inventive plate spring 11, at its underside 13 and at the outer and inner annular edges 14, 15, comprises (cross-hatched) surface layers 17, 17', 17" with an increased inherent compressive pre-stress, whereas the upper side 12 comprises a (dotted) surface layer 16 with a lower inherent compressive pre-stress than the surface layers 17, 17', 17". The properties of the surface layer 16 result from the standard heat treatment and plane pressing of plate springs. On the other hand, the inherent compressive pre-stress of the surface layer 17 is increased by mechanical compaction processes or additional heat treatment stages.

FIGS. 2(a)–2(c) illustrate a circular-ring-shaped plate spring of a substantially uniform material thickness and a conical basic shape, according to a second embodiment of the invention. The plate spring 21 comprises an externally conical upper side 22 and an internally conical underside 23, an outer annular edge 24 and an inner annular edge 25. From the inner annular edge 25 there start radially extending slots 28, each of which end on the central diameter of the plate spring 21 in a stress relieving rounded portion 29. Plate springs of this type are widely used in motor vehicle couplings. As can be seen only in FIG. 2(b), the inventive plate spring 21, at its underside 23 and at the outer and inner annular edges 24, 25, comprises (cross-hatched) surface layers 27, 27', 27" with an increased inherent compressive pre-stress, whereas the upper side 22 comprises a (dotted) surface layer 26 with a lower inherent compressive pre-stress than the surface layers 27. The properties of the surface layer 26 result from the standard heat treatment and plane pressing of plate springs. On the other hand, the inherent compressive pre-stress of the surface layers 27, 27', 27" is increased by mechanical compaction processes or additional heat treatment stages.

FIGS. 3(a)–(c) illustrate a circular-ring-shaped plate spring of a substantially uniform material thickness and a conical basic shape, according to a third embodiment of the invention. The plate spring 31 comprises an externally conical upper side 32 and an internally conical underside 33, an outer annular edge 34 and an inner annular edge 35. From the outer annular edge 34 there start radially extending slots 38, each of which ends on the central diameter of the plate spring 31 in a stress relieving rounded portion 39. As can be seen only in FIG. 3(b), the inventive plate spring 31, at its underside 33 and at the outer and inner annular edges 34, 35, comprises (cross-hatched) surface layers 37, 37', 37" with an increased inherent compressive pre-stress, whereas the upper side 32 comprises a (dotted) surface layer 36 with a lower inherent compressive pre-stress than the surface layer 37 or an inherent tensile pre-stress. The properties of the surface layer 36 result from the standard heat treatment and plane pressing of plate springs. On the other hand, the inherent compressive pre-stress of the surface layer 37 is increased by mechanical compaction processes or additional heat treatment stages.

The plate springs according to FIGS. 1 to 3 are normally formed out of plate metal in the form of a circular ring and then deformed into a conical shape. They are then heat-treated and surface-treated. This is followed by a plane pressing process wherein, with the yield point being exceeded and under plastic deformation, the plate springs are plane-pressed once. Internal tensile stressed on the upper side can remain.

What is claimed is:

1. A plate spring, comprising:
   a spring member having a substantially circular-ring-shape and including a substantially externally conical upper side (12, 22, 32) and a substantially internally conical underside (13, 23, 33) between which there is positioned an outer annular edge (14, 24, 34) and an inner annular edge (15, 25, 35), wherein, in the unloaded condition, the surface layer (17, 27, 37) of the underside (13, 23, 33) has a higher inherent compressive stress than the surface layer (16, 26, 36) of the upper side (12, 22, 32),
   wherein, in the unloaded condition, a substantial portion of the surface layer (17, 27, 37) of the outer annular edge (14, 24, 34) and of the inner annular edge (15, 25, 35) has a higher inherent compressive stress than the surface layer (16, 26, 36) of the upper side (12, 22, 32).

2. A plate spring according to claim 1, wherein, in the unloaded condition, the surface layer (16, 26, 36) of the upper side is free from an inherent compressive stress or subjected to an internal tensile stress.

3. A plate spring according to claim 1, wherein, in the unloaded condition, the surface layer (17, 27, 37) of the underside (13, 23, 33) and the surface layers (17', 27', 37'; 17", 27", 37") of the outer and inner annular edges (14, 24, 34; 15, 25, 35) have substantially the same increased inherent compressive stress.

4. A plate spring according to claim 1, wherein the outer annular edge (14) and the inner annular edge (15) are continuously circular-ring shaped.

5. A plate spring according to claim 1, wherein one of the annular edges (24, 35) is circular-ring-shaped and that from the other annular edge (25, 34) there start radially extending slots (28, 38) of a delimited length.

* * * * *